Sept. 29, 1953 E. G. SCHADE 2,653,820
CHUCK
Filed April 26, 1948 2 Sheets-Sheet 1
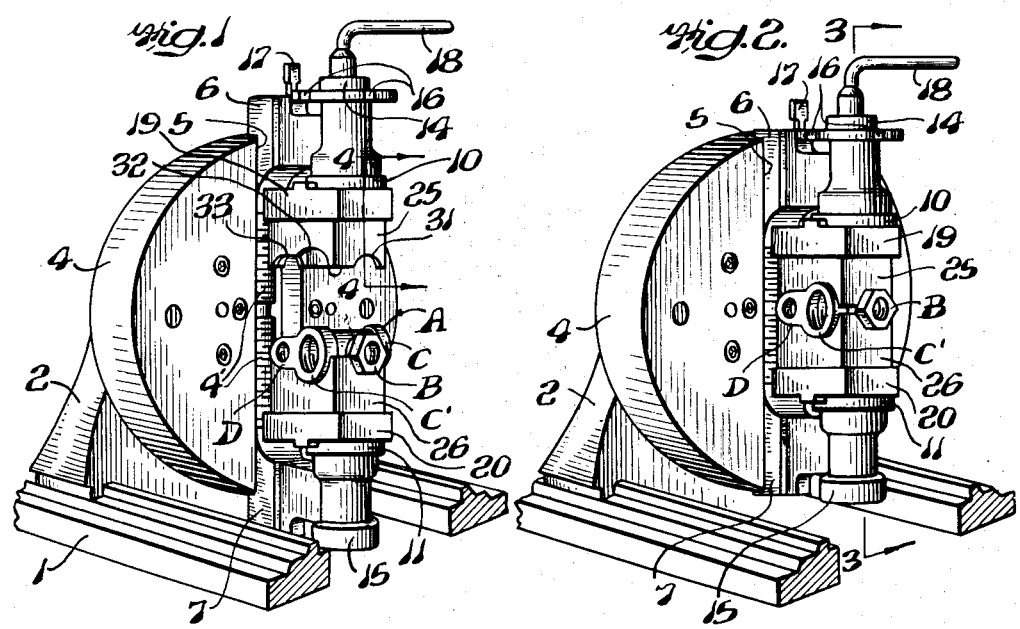
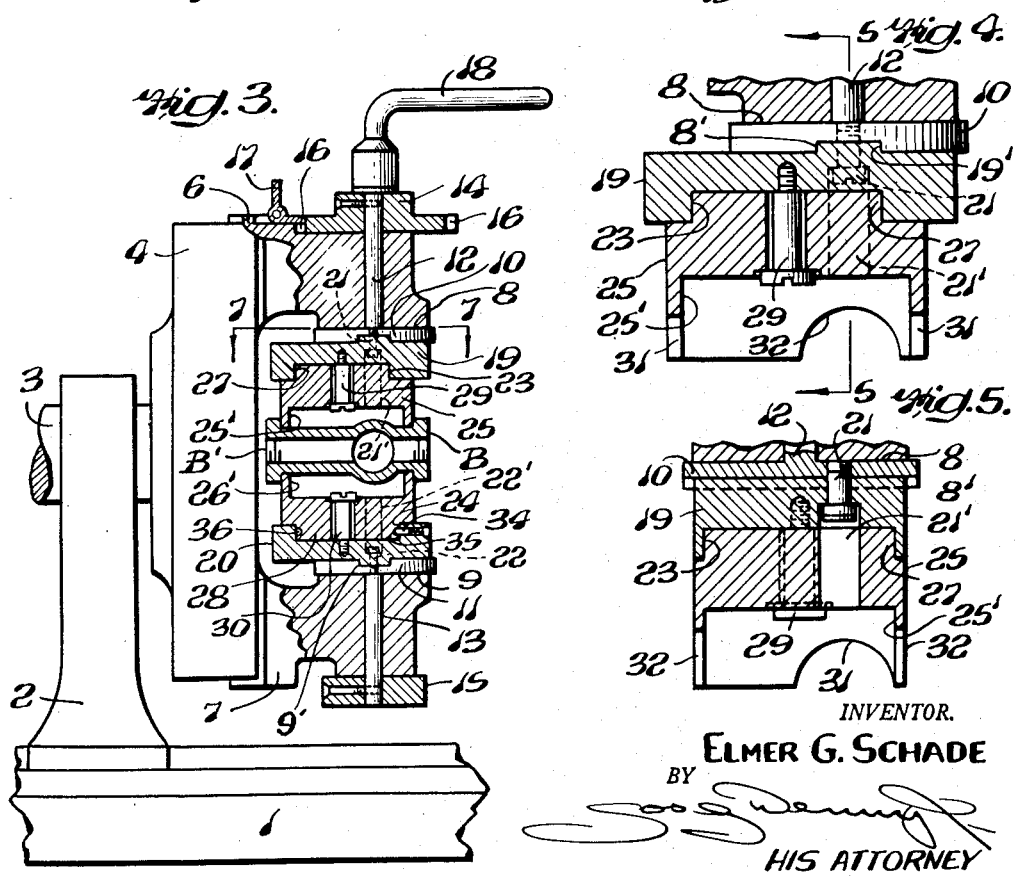
INVENTOR.
ELMER G. SCHADE
BY
HIS ATTORNEY Sept. 29, 1953 E. G. SCHADE 2,653,820
CHUCK
Filed April 26, 1948 2 Sheets-Sheet 2
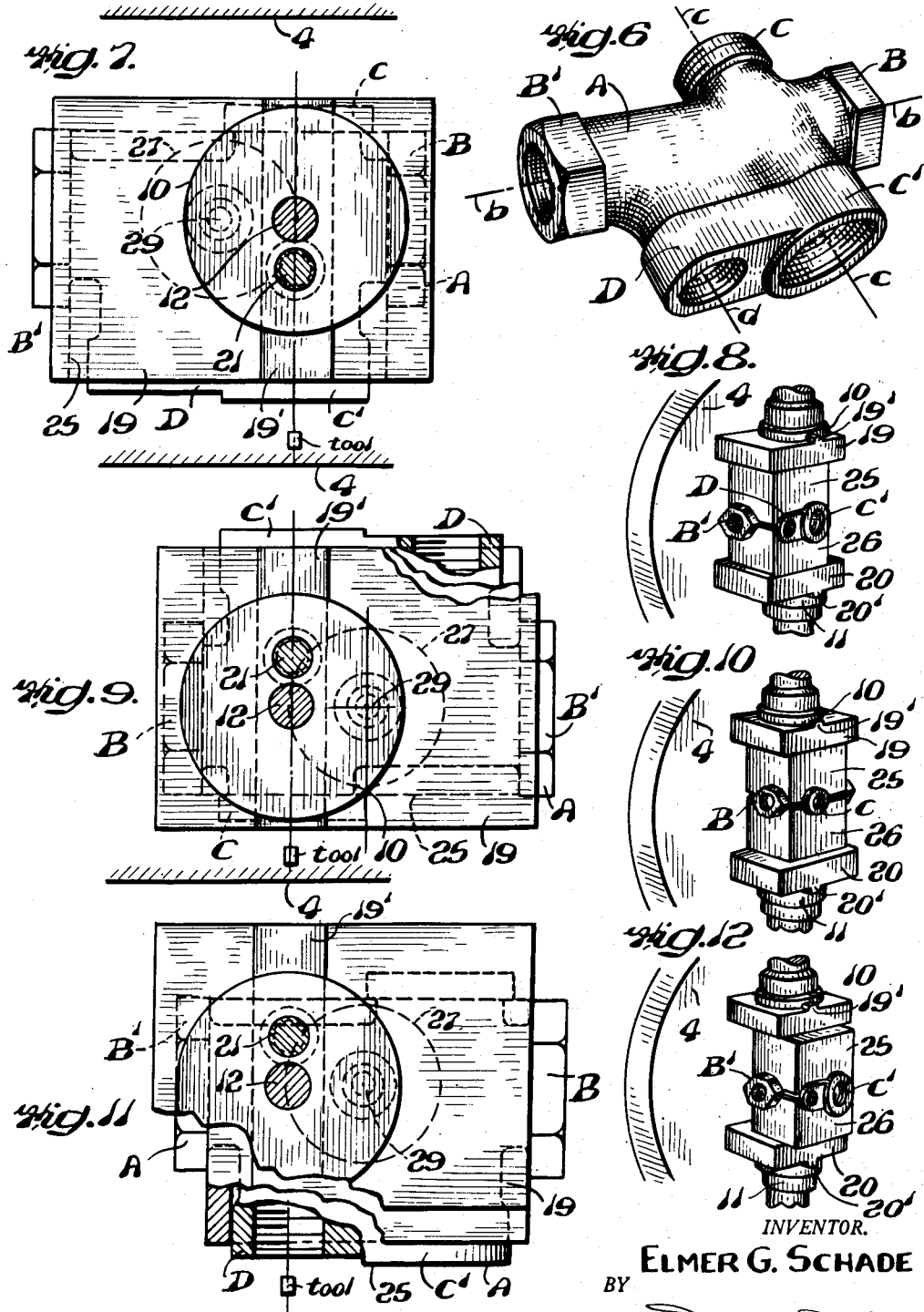
INVENTOR.
ELMER G. SCHADE
BY
HIS ATTORNEY Patented Sept. 29, 1953

2,653,820

UNITED STATES PATENT OFFICE 2,653,820

CHUCK

Elmer G. Schade, Hainesport, N. J., assignor to Schade Machine Works, Mount Holly, N. J., a corporation of New Jersey Application April 26, 1948, Serial No. 23,242

6 Claims. (Cl. 279—5)

My invention is a chuck or work-holder adapted for attachment to a machine tool and having relatively movable members permitting the true centering of offset portions of a blank or workpiece without removing it from the machine tool.

In the manufacture of various articles on machine tools, it is frequently desirable to machine a blank about spaced centers on the same face of the blank, as well as to thread, bore or ream inwardly from such face along parallel center lines, and to also do machine work on and to thread, bore, or ream inwardly from other faces of the blank.

It is usually necessary to re-chuck the blank or tool separately for the operations to be performed at or around spaced centers having parallel axes so as to bring the center of each part or area successively into exact alignment with the axis of rotation of the spindle supporting and rotating the chuck. The centering must be affected with great exactitude, and hence frequent chucking is likely to consume an amount of time disproportunate to the amount of work performed on the article after each chucking.

My invention provides a chuck by which spaced predetermined parts or areas on the same face of a blank may be centered, one after another, in alignment with the axis of the spindle supporting the work and in operative relation to a tool, or vice versa, and, desired predetermined parts or areas of other faces of the blank may also be centered in alignment with the axis of the supporting spindle and in operative relation to a tool without need for any re-chucking. By my improvements, a blank may be machined on true centers and along center lines which are parallel or transverse to one another, and, by use of a preferred embodiment of my invention, laterally offset parts or areas of a blank or workpiece may be accurately centered with respect to the spindle of a machine tool without detachment of the blank or work-piece from the chuck and by a simple manipulation of the latter requiring no technical skill or nicety of adjustment.

My improved chuck is designed primarily for use in, and in combination with, a machine tool having a spindle provided with a face plate having brackets movable radially thereon and supporting rotatable complementary heads having a common axis of rotation which is diametral to the axis of rotation of the spindle and which may be considered a primary axis of rotation for bringing different faces of the work into position to be operated upon. In the preferred embodiment of my invention, a pair of jaws are mounted on the heads and are rotatable therewith and are also rotatable relatively to the heads about a secondary axis parallel with but offset from the axis of rotation of the heads.

By a combination of rotary movements of the jaws about the axis of rotation of the heads, or primary axis, and about the offset axis of rotation of the jaws themselves, or secondary axis, spaced center points on the same face of a blank may be brought into alignment with the spindle axis without radial shifting of the blank relatively to the spindle axis. For example, if a center point on a blank is aligned with the spindle axis and the jaws are turned by turning the heads through 180 degrees about their primary axis and the jaws are then turned through 180 degrees about their own or secondary axis, a second center point on the same face will be brought into alignment with the spindle axis, and the center points will be spaced from one another a distance equal to twice the distance between the principal axis and the secondary axis around which the jaws have been turned.

One or both jaws may be profiled to form seats to position a particular blank so that desired center points on different faces thereof will be aligned with the spindle axis as the jaws are turned on the primary axis and so that desired center points on the same face of the blank will be aligned with the spindle axis as a result of turning the jaws on both the primary and secondary axes.

The principles of my invention will further appear from the following description and the accompanying drawings illustrating the best mode in which I have contemplated applying the principles of my invention.

In the drawings, Figure 1 is a perspective view of the headstock of a conventional lathe having my improved chuck or work-holder attached thereto with the jaws in open position and a work-piece comprising a pipe coupling blank seated on the profiled face of the lower jaw;

Figure 2 is a perspective view of the structure shown in Figure 1 but with the chuck jaws closed on the blank;

Figure 3 is an enlarged, part sectional, side elevation of the structure shown in Figures 1 and 2, with parts sectioned approximately on the line 3—3 of Figure 2;

Figure 4 is an enlarged fragmentary sectional view taken approximately on the line 4—4 of Figure 1;

Figure 5 is an enlarged fragmentary sectional view taken approximately on the line 5—5 of Figure 4;

Figure 6 is a perspective view of one of many types of blanks which may be centered by my improved chuck for machining various places on the same and different surfaces thereof;

Figure 7 is a horizontal view, partly in section, taken approximately on the line 7—7 of Figure 3 but with the parts at right angles to their positions, relative to the face plate, shown in Figures 2 and 3.

Figure 8 is a fragmentary, perspective and somewhat diagrammatic view of the parts relatively positioned as shown in Figure 7;

Figure 9 is a horizontal view, partly in section, of the parts shown in Figure 7 after the parts have been turned through 180 degrees about the principal axis of the jaws for centering work to be done on the face of the blank opposite that worked upon in Figure 7;

Figure 10 is a similar view to that shown in Figure 8 but with parts relatively positioned as shown in Figure 9;

Figure 11 is a horizontal view, partly in section, similar to those shown in Figures 7 and 9 but with the parts in the position they occupy after the jaws have been turned through 180 degrees about their secondary axis which is off-set from their primary axis: and Figure 12 is a view similar to those shown in Figures 8 and 10 but with parts relatively positioned as shown in Figure 11.

In the drawings, there is illustrated an embodiment of my invention in a conventional type of lathe having a usual bed 1 for supporting a headstock 2 in which is journaled a live spindle or mandrel 3 on which a conventional face plate 4 is mounted. The face plate 4 contains a diametrical slideway 5 for the brackets 6 and 7. Tht brackets are adjustable radially of the spindle 3 by means of a reversely threaded screw 4' in a usual manner. The brackets 6 and 7 form seats 8 and 9 for rotatable heads 10 and 11 which are held in place and are operable by arbors 12 and 13 journaled in the brackets and having retaining collars 14 and 15 pinned thereto. The collar 14 contains four equidistantly spaced, peripheral notches 16. A bell-crank latch 17 is pivoted on the bracket 6 in position for the engagement of one of its legs in any one of the notches 16 so that the head 8 may be securely locked in any one of four positons about the primary axis of rotation common to the arbors 12 and 13.

The arbor 12 extends through the collar 14 to form a polygonal hub for engagement by a socket wrench 18 to facilitate rotation of the arbor 12 and the head 8 when the latch 17 is disengaged from the notches 16.

In accordance with my invention, mounting blocks 19 and 20 are mortised to the heads 10 and 11 by the engagement of tenons 19' and 20' of the blocks in the slots 8' and 9' of the heads. Screws 21 and 22 are countersunk in the blocks 19 and 20 and threaded into the heads 8 and 9 to prevent the detachment of the blocks from the heads or the displacement of the blocks relatively to the heads.

The blocks 19 and 20 contain complementary circular seats 23 and 24 whose centers are in an axis parallel with but off-set laterally from the common axis of the arbors 12 and 13. Complementary jaws 25 and 26 have circular trunnions 27 and 28 journaled in the seats 23 and 24 and secured therein by headed pintles 29 and 30 which are threaded in the blocks 19 and 20 and form pivots for the jaws 25 and 26 concentric with the annular walls of the seats 23 and 24.

The jaws 25 and 26 may be conveniently made rectangular and provided with peripheral flanges 25' and 26' which may be profiled to conform to the contours of a blank or work-piece so as to insure the correct positioning of the work-piece in the jaws, or the work-piece may be secured to either of the jaws in any conventional manner.

Preferably the profiling of the jaw flanges forms pairs of seats 31 and 32 having intersecting center lines whose point of intersection is intersected by the common axis of the arbors 12 and 13. Either center line may be positioned concentric with the axis of the live spindle 3 by radially adjusting the brackets 6 and 7 to bring the center lines of the seats into the horizontal plane of the axis of the live spindle 3 and turning the arbors 12 and 13 until the latch 17 engages an appropriate notch 16.

The profiling of the jaw flanges also preferably forms a further seat 33 having a center line parallel to the center line of the seat 32 and spaced therefrom a distance equal to twice the distance between the common axis of rotation of the arbors 12 and 13 and the common axis of rotation of the jaws 25 and 26 in the circular seats 23 and 24.

The jaw 26 is held against inadvertent rotation in its annular seat by a spring pressed detent 34 which is engageable in the diametrical sockets 35 and 36 in the cylindrical pintle 29. The detent is however, so shaped that the application of sufficient torque to the jaw 26 will retract the detent and permit the rotation of the jaws about their common axis.

The blanks shown in Figure 6, as illustrative of one of many forms of work-pieces requiring the machining of off-centered parts, comprises a pipe coupling A having bosses B and B' which are to be internally threaded about a common center line b; a pair of bosses C and C', one of which is to be exteriorly threaded and the other internally threaded about a common axis c normal to the center line b, and a boss D which is to be internally threaded about a center line d parallel to the center line c but laterally off-set therefrom.

The flanges of the jaws 25 and 26 are profiled to conform to the contour of the individual type of blank to be machined in that particular pair of jaws, and the blocks 25 and 26 are so mounted in the heads 10 and 11 that, when the work-piece A is seated in the contoured jaws, the axis of the arbors 12 and 13 will intersect the intersection of the center lines b and c and be normal to the common plane of such center lines.

The blocks 19 and 20 are secured in desired position in the heads by passing the screws 21 and 22 through apertures 21' and 22' in the jaws and into the blocks and heads. The blank A is then deposited on the jaw 26 as shown in Figure 1 and the screw 4' is turned to clamp the jaws 25 and 26 on the blank and position it with the common plane of its center lines b—b and c—c intersecting the axis of the spindle 3.

With the blank or work-piece in this position, and the center line b—b coincident with the axis of the spindle 3, as indicated in Figures 2 and 3, a threading tool may be moved in the usual manner along the bed 1 and into position for internally threading the boss B about the center line b. When the threading of this boss has been completed and the tool has been withdrawn, the heads 10 and 11 and the chuck assembly carried thereby may be rotated through 90 degrees by releasing the latch 17 and turning the handle 18 clockwise so as to bring the center line c—c into alignment with the axis of the spindle 3. The boss C is then in position to be acted upon by an external threading tool.

When the threading of the boss C is completed and the tool retracted, the latch 17 is again released and the heads 10 and 11 and chuck assembly are again turned through 90 degrees by turning the handle 18 clockwise so as to bring the center line b—b again into alignment with the axis of the spindle 3 and to bring the boss B' into position to be acted upon by a threading tool.

When the threading of the boss B' has been completed and the threading tool withdrawn, the latch 17 is again released and the heads 10 and 11 and chuck assembly are again turned through 90 degrees by turning the handle 18 until the center line c—c is again brought into alignment of the axis of the spindle 3 and the boss C' is in position to be acted upon by a threading tool as indicated in Figs. 7 and 8.

After the boss C' has been threaded and the tool retracted, it is desired that the boss D be brought into position to be internally threaded about the center line d. This necessitates alignment of the center line d with the axis of rotation of the spindle 3. To effect this, the latch 17 is released and the handle 18 is turned through 180 degrees to turn the heads 10 and 11 and the chuck assembly about the axis of the arbors 12 and 13 and shift the blank A from the position shown in Figures 7 and 8 to the position shown in Figures 9 and 10. This results in turning the bosses C' and D from an exposed position opposite to the face plate 4 into a position adjacent to and parallel with the face of the face plate. The heads 10 and 11 are then latched in this position by the latch 17, and the jaws 25 and 26 are turned on the blocks 19 and 20, through 180 degrees about the secondary axis coincident with the centers of the circular seats 23 and 24 and with the axial centers of the pivots 29 and 30. This brings the center line d into alignment with the axis of the spindle 3, since the distance between the primary axis and the secondary axis is one half the distance between the parallel center lines c—c and d. The boss D is thus brought into position to be acted upon by the threading tool as shown in Figs. 11 and 12.

By turning the heads 10 and 11 from the positions shown in Figs. 11 and 12, through 180 degrees about the primary axis without moving the jaws about the secondary axis, the face of the blank opposite the boss D may be machined at a point off-set laterally from the center of the boss C initially machined, or by leaving the heads 10 and 11 in the position shown in Figs. 11 and 12 and turning the jaws around the secondary axis through 90 degrees in opposite directions from the positions shown in Figs. 11 and 12, the blank may be machined at points off-set from the center line b—b.

Each secondary center of machining along the center line d is spaced from the primary center adjacent thereto (along the line c—c) a distance equal to twice the distance between the center line of the key 19 which intersects the axis of rotation of the heads and blocks and a line parallel thereto which intersects the axis of rotation of the jaws on the blocks whereas each off-set center of machining off-set from the center line b—b is spaced therefrom a distance equal to the distance between said center line of the key 19 and the line parallel thereto intersecting the axis of rotation of the jaws on the blocks.

It will be understood that ordinarily a special chuck will be made for each type of blank or work-piece to be handled having different contours and different center to center spacing, but if desired a single sets of jaws may be provided with universal clamps for positioning different kinds of work having the same center-to-center spacing of places to be worked upon. Moreover the sequence of operations may be varied as desired.

Having described my invention, I claim:

1. A chuck comprising a pair of complementary jaws having profiled faces forming centering seats with parallel center lines spaced from one another, mountings for said jaws and relatively to which said jaws are rotatable about an axis normal to the center line of one of said seats, and supports for said mountings and relatively to which said mountings are rotatable about an axis parallel to said first named axis, said second named axis being spaced from said first named axis a distance approximately one-half the distance between the center lines of said seats.

2. A chuck comprising a jaw for holding a work piece, a mounting on which said jaw is rotatable about an axis, and a support relatively to which said mounting is rotatable about an axis parallel with and in fixed relation to and off-set from said axis first named, said mounting and jaw being relatively movable to one another and to said support to effect true centering of offset portions of a work piece on said jaw without removing it from the chuck.

3. In a machine tool having a spindle rotatable about an axis, a bracket supported by and movable radially relatively to the axis of said spindle, a member supported by said bracket and rotatable relatively thereto about an axis extending radially to said axis first named, a chuck comprising a jaw supported by said member and rotatable about an axis parallel with and off-set from said second named axis, and means for securing a blank to said jaw.

4. The combination with a machine tool having a spindle rotatable about an axis, a face plate fixed to said spindle, brackets movable relatively to said face plate and radially to the axis of said spindle, heads rotatable in the respective brackets about an axis diametral to the axis of said spindle, blocks attached to said heads and rotatable therewith, jaws rotatable relatively to said blocks about an axis off-set from said second named axis, and indexing devices for positioning said heads relatively to said brackets and for positioning said jaws relatively to said heads.

5. A chuck comprising a pair of bases each having a tenon on one face thereof and a circular seat on the other face thereof, each seat having a center off-set laterally from the longitudinal center line of said tenon, a jaw rotatable on each of said seats about its center, said jaws being profiled to form spaced seats for positioning a blank with work-centers spaced from one another twice the distance between said seat center and the longitudinal center line of said tenon.

6. The combination with a machine tool having a face plate rotatable about an axis, of a chuck having a jaw for holding a work piece supported by said face plate and rotatable about two spaced parallel axes, in fixed relation to one another, one of said axes being normal to the axis of rotation of said face plate, said jaw being movable about the respective axes and thereby effecting true centering of offset portions of a work piece held by said jaw with the axis of said face plate without removing said work piece from said jaw.

ELMER G. SCHADE.

References Cited in the file of this patent

UNITED STATES PATENTS

| Number | Name | Date |
|---|---|---|
| 635,243 | Garvey | Oct. 17, 1899 |
| 641,380 | Garvey | Jan. 16, 1900 |
| 801,001 | Gilbert | Oct. 3, 1905 |
| 983,918 | McClellan | Feb. 14, 1911 |
| 1,173,159 | Banks | Feb. 29, 1916 |
| 1,187,856 | Moss | June 20, 1916 |
| 1,565,820 | Saunders | Dec. 15, 1925 |
| 1,662,571 | Frick | Mar. 13, 1928 |
| 2,067,399 | Hughes | Jan. 12, 1937 |
| 2,357,062 | Stoll | Aug. 29, 1944 |

OTHER REFERENCES

American Machinist, July 17, 1947, pages 145 and 146.